March 2, 1954 R. M. WILMOTTE 2,670,650
ELECTRONIC LIMIT MICROMETER
Filed April 25, 1950 4 Sheets-Sheet 2

INVENTOR.
RAYMOND M. WILMOTTE

BY
ATTORNEY

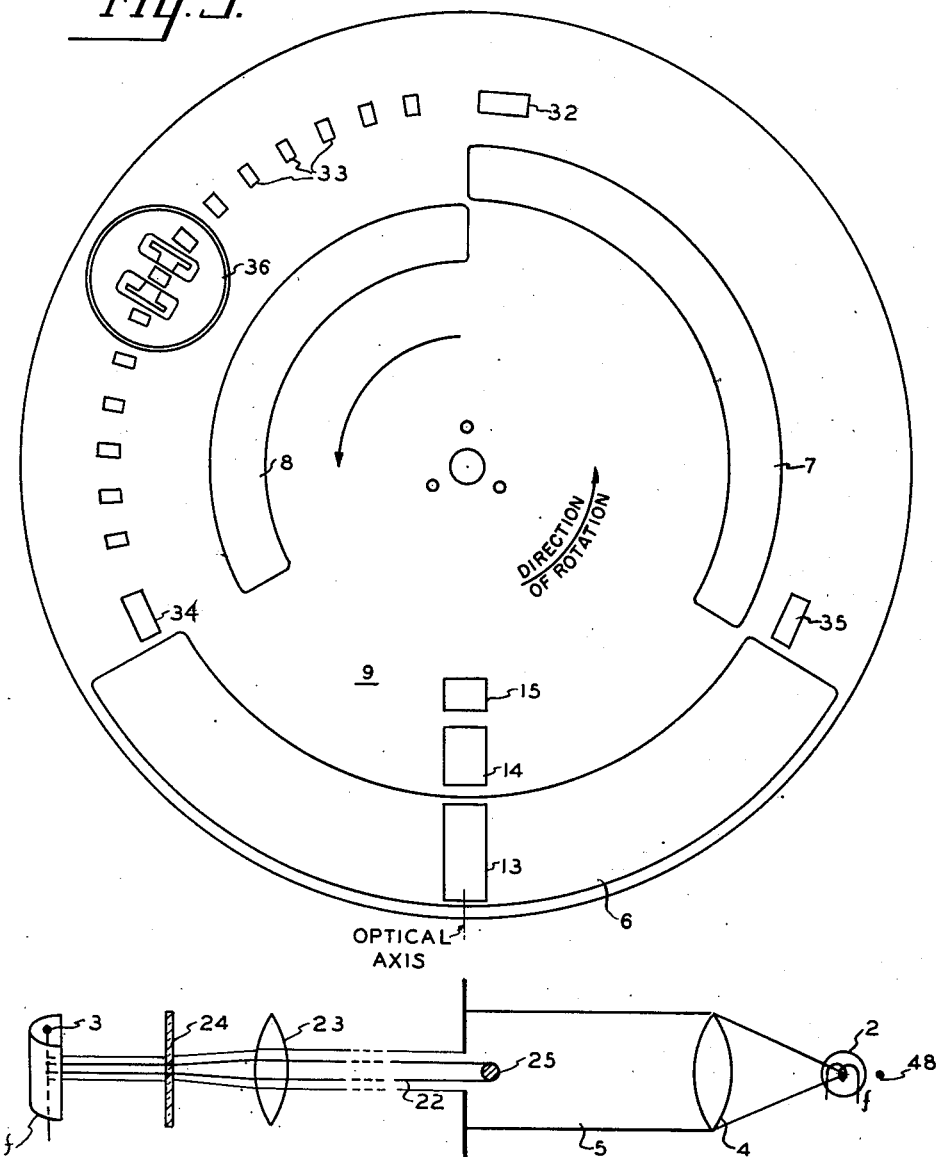

March 2, 1954

R. M. WILMOTTE 2,670,650

ELECTRONIC LIMIT MICROMETER

Filed April 25, 1950

Inventor
RAYMOND M. WILMOTTE

By

ATTORNEY

Patented Mar. 2, 1954

2,670,650

UNITED STATES PATENT OFFICE 2,670,650

ELECTRONIC LIMIT MICROMETER

Raymond M. Wilmotte, Washington, D. C., assignor to Padevco, Inc., Washington, D. C., a corporation of Delaware Application April 25, 1950, Serial No. 157,996

5 Claims. (Cl. 88—14)

This invention relates generally to measuring equipment and more particularly to electronic systems for providing continuous indications of a value of a measurable quantity with respect to a pair of further values which may be used, if desired, to establish upper and lower limits, or tolerances, for the first value.

In the manufacture of a product on a continuous or mass production basis, it is essential closely to monitor the product to determine at all times whether certain parameters thereof are being held within desired tolerances. In the measurement of mechanical dimensions, the use of a mechanical micrometer or the like for accomplishing the measurements involves serious limitation, since in order to make a measurement by means of a mechanical micrometer production must be stopped during the measurement, and then re-established. The time required for making the measurement, further, is considerable and the human factor introduced leads to inaccuracies of product. In the manufacture of a product such as wire, rod or thread, for example, by continuous process, shut down of the processing machine is impractical. It is usual, therefore, to resort to sampling or spot check. Unless the sampling or spot checks are taken often, the inspection is inadequate, and considerable spoilage of the finished product may result. In measuring dimensions of soft articles or materials, moreover, the act of measurement may itself deform the object being measured, giving rise to important errors.

In the manufacture of rod, wire or thread, or the like, for example, it is desired to gauge the diameter of the rod, wire or thread as it leaves the fabricating machine and travels past the measuring instrument, at a rate of hundreds of feet per minute, and to determine whether the diameter of the rod, wire or thread, or the like, is being held within desired tolerances. It is highly desirable that the measurements be made without stopping the fabricating machine, since each stoppage results in considerable economic loss. For this purpose, electronic micrometers of various types, and particularly photo-electric micrometers, operating on the principle of measuring the total light flux in a light beam through which passes the object to be measured, are well known.

In accordance with the present invention, I provide a photo-cell and a source of illumination, which illuminates the photo-cell through each of three slots in succession. One of the slots is partially obscured by the object to be gauged, the unobscured portion of the slot being, accordingly, a measure of the size of the object. The remaining slots are adjusted each to allow a predetermined light flux to fall on the photo-cell in accordance, respectively, with desired upper and lower limits of the size of the object. A beam of light deriving from the source of illumination is permitted to strike the photo-cell through the slots one at a time, or in succession, so that at the output terminals of the photo-cell circuit, there is created a sequence of signals having amplitudes, in succession, equal to a desired upper value, a measured quantity and a desired lower value, in terms of the light flux passing in succession through the slots. For convenience as indicative of one possible field of use, the upper and lower values will be sometimes referred to as "limits" or as defining a tolerance range, hereinafter. The output signals provided by the photo-cell are applied to an alternating current amplifier, which blocks the D. C. components of the signals provided by the photo-cell, and passes to its output only the A. C. components of those signals. These A. C. components correspond in amplitude with the differences of amplitude of the successive signals provided by the photo-cell, and accordingly with differences of light flux provided by the measuring slot with respect to the upper and lower limit slots, entirely without regard for the absolute sizes of the slots, or the absolute values of the light flux passing therethrough. In this manner the instrument of my invention provides a comparison measurement rather than an absolute measurement of size. The comparison relates the size of an object to be gauged to the sizes of two other objects, presenting respectively upper and lower limits beyond which it is desired that the size of the object to be gauged does not vary.

Systems of the character described hereinabove have been fully described and illustrated in an application for U. S. patent, Serial No. 767,428, filed in the name of Norman H. Taylor and Raymond M. Wilmotte on August 8, 1947, and entitled "Automatic Electronic Tolerance Monitor," and now U. S. Patent No. 2,532,964, as well as in a further application for U. S. patent, Serial No. 740,676, filed in the name of Raymond M. Wilmotte and Robert E. Benedict on April 10, 1947, for a "Photo Electronic Limit Gauge," now U. S. Patent No. 2,505,316, and in a further application for U. S. patent, Serial No. 698,345, filed in the name of Norman H. Taylor on September 20, 1946, for "Electronic Micrometer," now abandoned, the patents all being assigned to Padevco, Incorporated, of Washington, D. C.

It is the broad object of the present invention to provide various improvements and refinements in systems of the character disclosed in the above identified applications for Letters Patent, and for increasing the accuracy and flexibility of applications thereof.

In measuring the diameter of a rod, wire, thread, or the like, passing by the measuring slot referred to above, a source of inaccuracy in measurements effected in accordance with the present system relates to the variation of position of the measured object with respect to the slot. The inaccuracy comes about by reason of the fact that the light flux density passing through the slot is not precisely uniform, so that as the wire or thread moves laterally to its direction of motion past the slot, which may occur inadvertently during high speed production, variations of total light flux through the slot occur which are not generated by variations in diameter of the rod, wire, thread, or the like, but solely by reason of nonuniformity of the light flux passing through the slot. I have found that this source of inaccuracy may be removed in various alternative ways.

It is an object of the present invention to provide accuracy of measurements in electronic photo-electric gauging equipment, by establishing uniform light flux in gauging slots in the equipment.

Since in many applications of my novel gauging equipment the measurement to be accomplished relates to the diameter of a moving rod, wire, thread, or the like, and since the object to be gauged may have an undesired component of motion laterally of its direction of travel only, it is not, in all cases, absolutely essential that the light flux density be uniform over the entire area of the slot. It is, in many cases, sufficient if the light flux density is uniform for any increment of area of the slots having boundaries measured in one dimension extending entirely across the slot in the direction of travel of the object to be measured, and in the other dimension involving only an extremely small increment perpendicular to the first dimension. In this manner, the object to be measured stops the slot equally with respect to light flux passing therethrough, for any transverse position of the object to be measured, despite lack of uniformity of light flux density in the dimension parallel to the direction of travel of the object.

Nevertheless, uniformity of light through the slot either over its entire area, or over increments of area taken transversely of the slot, may be accomplished by properly applying to the slot corrective light valves in accordance with the teaching of my invention.

It is, accordingly, an object of the present invention to provide methods and structures for rendering uniform the total light passing through an aperture in an electronic gauging mechanism for all lateral positions of the object being gauged.

I have found, regardless of the presence of corrective light valves in the measuring aperture, that certain errors occur by reason of motion of the object to be measured parallel to the light beam, and that this error may be minimized or substantially corrected by suitable distortion of the light beam, the rays of light being caused to diverge very slightly as they approach the object being gauged, rather than being precisely parallel.

It is, accordingly, a further object of the present invention to provide corrections in electronic gauges for movements of the object to be measured in a direction parallel to the beam of light utilized in making the measurement.

In the practice of my invention wherein is utilized a cathode ray tube indicator for providing visual indications of the relation of a measured magnitude to two predetermined values of that magnitude, as in the co-pending applications for Letters Patent of the United States referred to above, the indications may be provided in the form of lines extending transversely across the face of a cathode ray tube indicator. The desired limiting values of the measurements may be established by an upper and a lower line, the measurement corresponding with the object being represented in terms of a line extending between the upper and lower lines. So long as the measurement of the lower object is within the desired tolerances, its representative line will be located between the maximum and minimum lines referred to. However, should the measurement of the object exceed the desired tolerances, in one direction or the other, the representative line will be found above or below the lines representing the limits. In this situation question may arise concerning which of the lines represent the measurement, and which the limits, and the display on the face of the indicator may accordingly be ambiguous.

It is, therefore, still another object of the present invention to provide means for positively identifying the line indication which represents the dimension of the object to be measured, and for distinguishing that line from the lines representing the predetermined values.

The type of visual indication provided by the embodiment of my invention disclosed in the above identified applications, which provide a visual indication of comparative values of a measurement representing an upper limit and a measurement representing a lower limit, and a measurement representing an actual value associated with a gauged object, in terms of three discrete visual presentations on the face of a cathode ray tube, or on a record receiving surface of a recording device, has been found to be of great value and utility. The necessity for the use of a cathode ray tube indicator, or of a recorder, however, introduces a considerable portion of the expense involved in building equipment in accordance with my invention. For many purposes a single indication of the relation of the value of the measured quantity to the average value of the two limits is sufficient for practical purposes. Alternatively, such an indication may be provided additionally to a cathode ray tube indication. Such an indication may be provided on the face of a meter in terms of the position of the pointer of an ordinary, relatively inexpensive, meter associated with appropriate circuits for deriving a voltage or a current, the magnitude of which is a measure of the desired comparison.

It is a further object of the present invention, accordingly, to provide a system for indicating in terms of the position of the pointer of a single meter, a measure of the relation between a measured value and the average of a pair of limiting values extending one on each side of the measured value, and establishing tolerances for the measured value.

The fact that a single voltage is developed which represents a comparison of a value of a measurable quantity with values representing maximum permissible upper and lower limits of that quantity, provides a control signal which may be employed to terminate operation of a fabricating machine automatically, when the machine becomes so maladjusted that its product fails to fall within predetermined tolerances. In the alternative, the control signal may be employed to effect a continual readjustment of the machine to maintain its operation such that the product produced thereby falls within the desired tolerances.

It is, accordingly, still another object of the present invention to provide a system for developing, and indicating by means of a simple and inexpensive meter, the value of the deviation of a measured quantity from pre-assigned values or tolerances.

It is a further object of the present invention to provide a system of indication and automatic control, responsive to deviation of a measured quantity beyond either of a pair of values, which may, if desired, establish upper and lower tolerances for the value of the measured quantity.

In systems of the above character, accuracy of measurement depends upon the maintenance of a predetermined gain in signal amplifiers which are utilized to transfer the output of the photo-cell unit to an indicator or control unit, whatever form this indicator or control unit may take. Any variation of this gain will affect the character of the indications, and particularly if the indication is unitary, in terms of a meter reading, leads to inaccuracy of the reading. In accordance with a further feature of the present invention, I have incorporated a novel automatic gain control circuit in the system of my invention, for maintaining constant the gain of signal amplifiers included therein, whereby to increase the reliability and accuracy of the system. This automatic gain control circuit develops an automatic gain control voltage from measurements of the values or limits established for the measurements involved, and, these values being constant for any given measuring operation, measurements relating the quantity the value of which is to be determined to the values or remain accurate despite variations of total light flux available in the system, of the sensitivity of the photo-cell utilized, and of variations in applied voltages and circuit parameters pertaining to electronic amplifying circuits utilized in the system.

The above and still further objects, advantages and novel features of my invention will become obvious upon consideration of the following detailed description of various embodiments of my invention, especially when taken in conjunction with the accompanying drawings, wherein:

Figure 4 illustrates the optical arrangement of the system, and particularly the optical relationship of the elements of the system as arranged for eliminating errors due to motion of a gauged object parallel to the light rays in the optical system;

Figure 5 is a view in plan indicating the relative positions of elements of a scanning disc arranged to provide synchronizing signals and indication identifying signals in the system illustrated in Figure 1;

Figure 6:
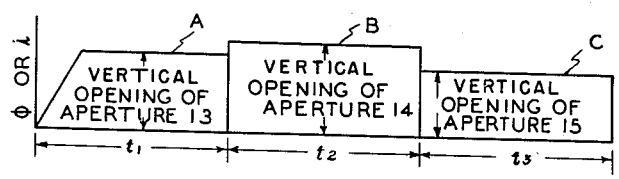
Figure 7:
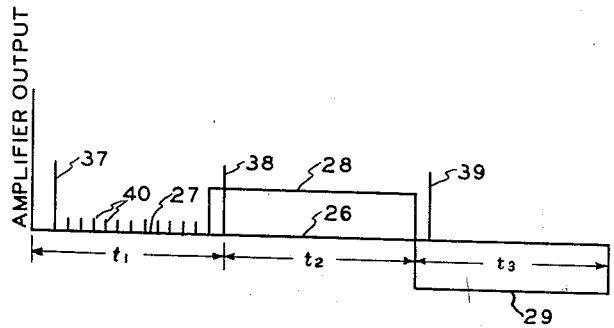
Figure 8:
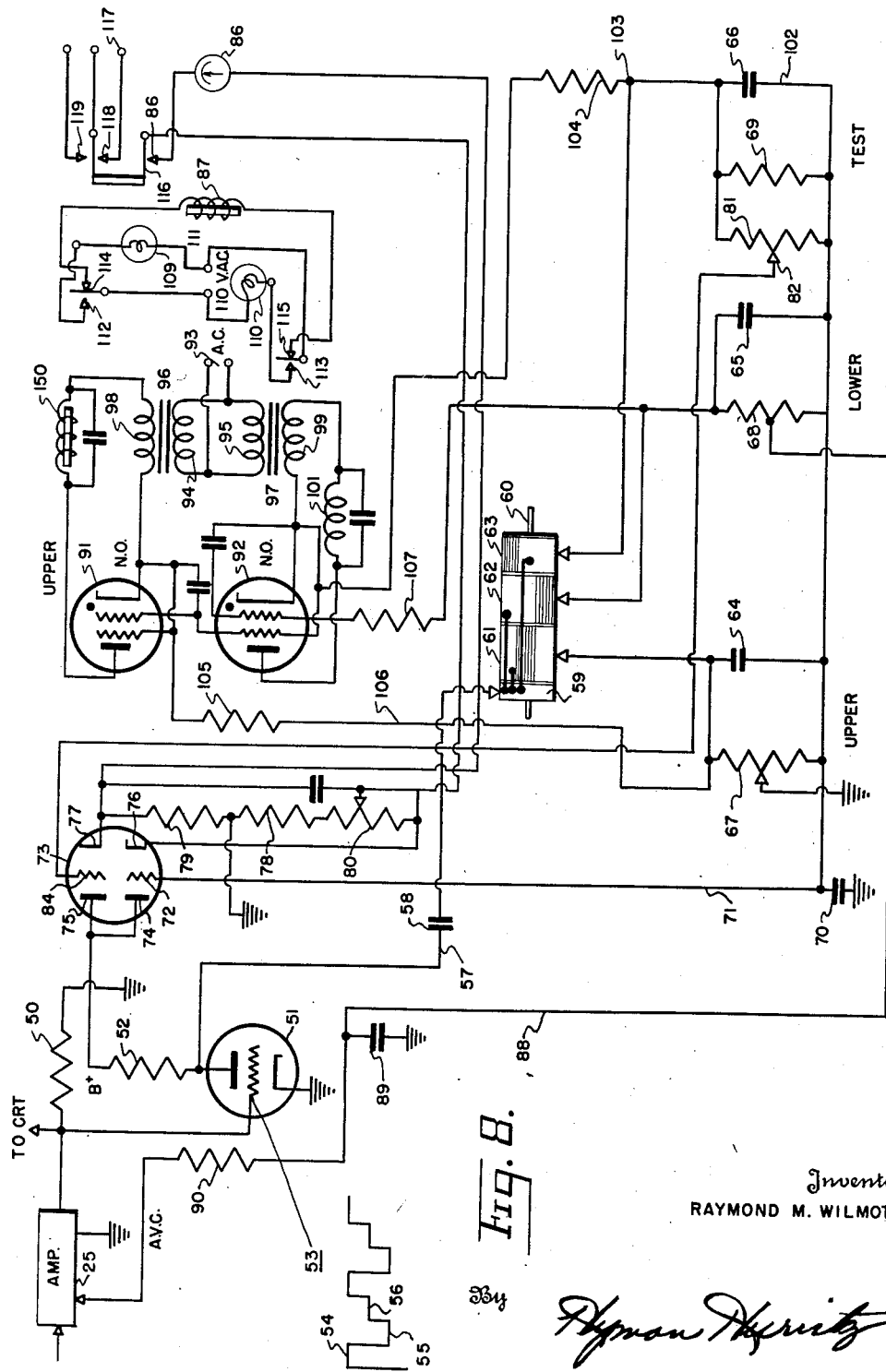

Figures 6 and 7 represent certain wave forms developed in the course of operation of the system; and Figure 8 is a schematic circuit diagram of an electrical system for converting periodic measurements of a gauged dimension and of permissible or desired upper and lower values of that dimension into a single meter indication of the relationship between the gauged dimension and the permissible or desired values, for providing indications that the value of a measured quantity has deviated beyond certain pre-assigned values, and for providing a novel automatic volume control system for increasing the accuracy of the system.

Figure 1:
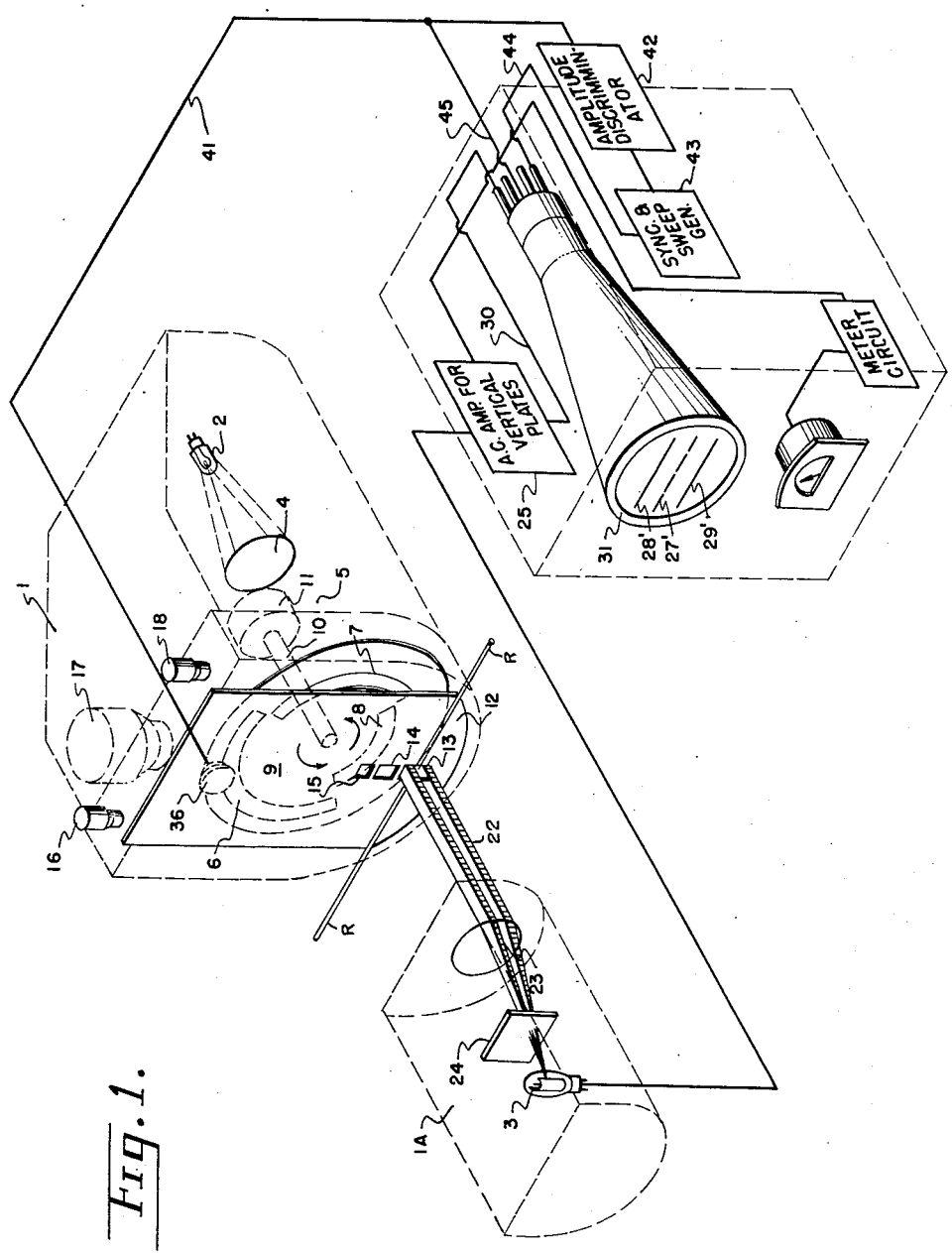
Figure 1 is a view in perspective of an embodiment of my invention, with the details of construction simplified and conventionalized, and including a functional block diagram of an electrical circuit comprised in the system.

Referring now specifically to Figure 1 of the drawings, the reference numeral 1 represents a casing for various portions of the system of my invention, casing 1 being represented by dotted lines in the drawings to indicate that the representation is of the outlines of the casing 1 only. A lamp 2 is provided internally of the casing 1, which illuminates a photo-cell 3, contained within a further casing 1a, a lens 4 being provided to collimate the light originating in the light source 2 into an infinitely great plurality of light rays constituting a light beam 5 of generally circular cross section. The light beam 5, in accordance with one important feature of the invention, may be arranged to diverge slightly as it leaves the lens 4 by locating the source of light 2 slightly nearer to the lens 4 than the geometrical focus of the lens 4. The light beam 5 then proceeds via one or another of a series slots 6, 7 and 8, formed in a scanning disc represented generally by the reference numeral 9, which is mounted co-axially on a shaft 10, the latter being rotated by means of an electric motor 11 at some convenient rotative speed. The slots 6, 7 and 8 are mutually at relatively different, and successively decreasing, radii from the center of rotation provided by the shaft 10, and each of the slots occupies an angle of 120° about the scanning disc 9, these angles having substantially no overlapping portions.

A plate 12 is provided, the plane of which is parallel to and adjacent the plane of the scanning disc 9, and which contains a series of three (3) rectangular apertures 13, 14 and 15, which are aligned respectively with the scanning slots 6, 7 and 8 formed in the disc 9, so that the light rays passing the scanning slot 6 pass through the aperture 13, the light rays passing the scanning slot 7 pass through the aperture 14, and the light rays passing the scanning slot 8 pass through the aperture 15. The vertical height of the apertures 13, 14 and 15 may be adjusted by means of manually operable screw mechanisms 16, 17 and 18, which operate closures (not shown) associated with the apertures 13, 14 and 15, respectively, for determining the total height of each of the apertures independently of the others, and thereby determining the total quantity of light permitted to pass through the apertures. Scanning slots 6, 7 and 8 are arranged to have heights slightly greater than the maximum height to which the respectively associated apertures 13, 14 and 15 may be adjusted, so that slots 6, 7 and 8 either completely unblock the apertures associated therewith respectively, or they are completely blocked, depending upon the angular position of the disc 9. That portion 22 of the light beam 5 which passes through one of the scanning slots 6, 7, 8, and a corresponding one of the apertures 13, 14 and 15, is then focussed by means of a lens 23 onto the cathode of the photo-cell 3, via a light diffusing element 24. The lens 23 is arranged to concentrate light arriving thereon, in a direction substantially parallel with the axis of the lens, directly on the photo-cell cathode. It will be obvious, however, that light rays arriving at the photo-electric cell 3 from various portions of the lens 23, as determined by the particular aperture 13, 14 and 15 which passes the light, may fall upon different portions of the cathode of the photo-cell 3, so that should variations of photo-emissivity of the cathode of the photo-cells exist, current flow from the photo-cell will not be uniform despite the fact that the total flux of the light beams provided by each of the apertures 13, 14 and 15 is truly equal. It is further undesirable to obtain the total emission of a photo-cell from an extremely small area of its cathode, since this shortens the life of the cell and will overload same. It is the function of the diffusing element 24 to present a diffuse rather than a highly concentrated light beam to the cathode of the photo-cell 3, in order that the current flowing in the photo-cell 3 shall be an average current determined by the photo-emissivity of a considerable area of the cathode of the photo-cell 3, thus rendering the action of the system more accurate and uniform and more independent of the variations of structure of the cathode of the photo-cell 3, and further to increase the life of the cell.

Passing behind the aperture 13 is a rod or wire R, the diameter of which is to be compared with the heights of the apertures 14 and 15. For this purpose, the total height of the aperture 13 is arranged to have a value such that when the desired height of the wire or rod R is subtracted therefrom the resulting value will fall intermediate the heights of the apertures 14 and 15, the difference between the height of the aperture 14 and the resulting value being algebraically positive and the difference between the height of the aperture 15 and the resulting value being algebraically negative, and these differences being arranged by adjustment of suitable closures in response to settings of micrometer screws 16 and 18, which may be set to desired limits beyond which the dimension of the wire or rod R is not desired to vary. The scanning disc 9 transfers portions of the light beam 5 in succession to the apertures 13, 14 and 15, so that the light reaching the photo-cell 3 contains light fluxes corresponding in succession to the unblocked areas of the apertures 13, 14 and 15.

Referring specifically to Figure 6 of the drawings and assuming that the times $t_1$, $t_2$, $t_3$, correspond with the times during which successive ones of the apertures 13, 14 and 15 are illuminated via associated scanning slots 6, 7 and 8, the total light flux, $\phi$, passing through the apertures 13, 14 and 15, in succession over successive periods of time, $t_1$, $t_2$, $t_3$, will be represented by the ordinate of the graph shown in Figure 6, and the current, $i$, flowing in the photo-cell 3 will present a precisely duplicating function of time. The output current of the photo-cell 3 may be applied to the input circuit of an amplifier 25, which is required, in accordance with the invention, to be of the alternating current type, and which includes circuits for blocking the D. C. component of the current supplied thereto. Since the differences between the three signal components A, B and C, comprising the graph of Figure 6, may be assumed to be extremely small in comparison with the absolute value of any one of the components, the A. C. amplifier 25 may amplify very considerably the alternating current components of the signals without overloading, the graph of the output current derivable from the amplifier 25 being represented by the graph of Figure 7 of the drawings, wherein the line 26 represents the zero axis of the graph, and wherein the amplitude of the signal generated during time $t_1$ is assumed to be equal to the average value of the output of the amplifier 25, that average value being represented by zero output. Lines 28 and 29, then, represent deviations from this average value during times $t_2$ and $t_3$. Voltages corresponding with the output levels 27, 28 and 29 may be applied via the lead 30 (Figure 1) to the vertical plates of a cathode ray tube 31, thus serving to deflect vertically the beam of the cathode ray tube 31 in accordance with the magnitudes of the voltages.

It should be realized that the ordinate of the line 27 need not be zero, and, in fact that this condition will subsist only if the ordinate of the line 27 is precisely intermediate the ordinates of the lines 28 and 29, since only then will be ordinate of line 27 equal the average of the ordinates of lines 27, 28 and 29.

In general, the ordinate of the line 27 may fall anywhere between the ordinates of the lines 28 and 29, or may exceed either of these, depending on the relative measures of the uncovered areas of the apertures 13, 14, 15, it being the relative differences of these areas which are measured in the system, assuming a constant flux density in the beam 5.

Since the ordinate of the line 27 may exceed the ordinate of either the line 28 or the line 29, depending upon the magnitude of the deviation of the diameter of wire or rod or thread being gauged from the established tolerances, it is essential in the operation of systems constructed in accordance with my invention that the line 27 be susceptible of identification. Furthermore, if traces 27', 28', 29' are to be established on the face of the cathode ray tube indicator 31 at vertical heights corresponding with the ordinates of the lines 27, 28 and 29, it is essential that the horizontal sweeps of the beam of the cathode ray tube indicator 31 be synchronized with the rotation of the scanning disc 6 in such manner that the duration of each of the traces 27', 28', 29' coincide with the traverse of a corresponding one of scanning slots 6, 7, 8 by an associated aperture 13, 14 and 15. This synchronization may be accomplished, as was done in the machines comprising the inventions disclosed in the above-identified applications, by utilizing a synchronous motor for driving the scanning disc 6 and utilizing the driving voltage for the motor for synchronizing the horizontal sweep of the cathode ray tube indicator 31.

As an alternative method, and in accordance with one feature of the present invention, synchronization of the horizontal sweep of the cathode ray tube indicator 31 is accomplished directly from the motion of the scanning disc 9, in a manner now to be described, and which is advantageous when considered in relation to the methods disclosed in the above identified applications for Letters Patent of the United States, in that synchronization is accomplished directly from the position of the scanning disc 9, rather than indirectly.

Reference is now made to Figure 5 of the drawings, wherein is illustrated in plan view a scanning disc constructed in accordance with the present invention. The scanning slots 6, 7 and 8 may be seen, formed in the scanning disc 9, each appending an arc of 120°, and the slots 6, 7 and 8 being arranged at successively decreasing radii. It will be noted that the slot 6 has a far greater height than the slots 7 and 8. The reason for use of a slot 6 of greater height than slots 7 and 8 is that the slot 6 will, during operation of the present system for performing a gauging operation, be partially covered by wire, thread or rod being gauged, so that only the difference between the height of the slot and the diameter of the rod, thread or wire being gauged is available for passage of light, and it is this difference which must be compared with the heights of slots 7 and 8.

Apertures 13, 14 and 15 are illustrated, in outline, to show the relation of these apertures to the scanning slots 6, 7 and 8. The direction of rotation of the scanning disc 9 is counter-clockwise, as viewed.

Secured to the scanning disc 9 adjacent the leading end of the scanning slot 7 is a permanent magnet 32. Distributed about that sector of the scanning disc 9 which is occupied by the scanning slot 8 is a further plurality of permanent magnets, 33, which are each of considerably less width than the width of the permanent magnet 32 and which are spaced apart by distances slightly greater than the width of the individual magnets. There is further provided in the disc sector corresponding with that occupied by the scanning slot 8, and adjacent the leading edge of slot 8, an additional permanent magnet 34, having a width equal to the width of the permanent magnet 32. Placed adjacent the leading end of the slot 6 within the sector occupied by slot 7 is still another permanent magnet 35 which is a duplicate of the magnets 32 and 34. The magnets 32, 33, 34 and 35 are all arranged at the same radial distance from the rotative center of the scanning disc 9.

Secured to the plate 12, which is located adjacent to and parallel with the plane of the scanning disc 9, is a magnetic pick-up device 36, comprising one or more coils of wire having a relatively large number of turns, the inductance of which may be increased by association therewith of magnetic material of high permeability. The pickup unit 36, being secured to the plate 12, is stationary, while the permanent magnets 32, 33, 34 and 35, being secured by the scanning disc 9, rotate therewith. In passing by the pickup unit 36 each of the magnets induces therein a voltage pulse.

Since the position occupied by the pick-up disc 36 bisects the angle occupied by the scanning slot 8 it will be clear that, substantially at the instant the leading edge of the scanning slot 6 arrives opposite the scanning aperture 13, the permanent magnet 34 will pass by the pick-up unit 36, generating a pulse therein. It will be further obvious that, a very short time after arrival of the leading edge of the scanning slot 8 opposite the aperture 14, the magnet 32 will arrive opposite the pick-up element 36; and, that a very short time after the leading edge of the scanning slot 7 arrives at the aperture 14, the magnet 35 will pass under the pick-up unit 36. While the scanning slot 6 is passing by the aperture 13, moreover, the succession of small permanent magnets 33 will pass under the pick-up unit 36.

The resulting voltage pulses generated in the pick-up unit 36 correspond with the plotted pulses 37, 38 and 39 (Figure 7) generated by passage of the magnet 34, 35 and 32, respectively, under the pick-up unit 36, these pulses being of relatively long duration and high intensity, and occurring at times slightly delayed with respect to initiation of the lines 27, 28 and 29, since the positioning of the magnet 34, 35 and 32 is delayed with respect to the leading ends of the end of the scanning slots 6, 7 and 8. The small magnets 33, on the other hand, serve to generate pulses 40 which are of relatively short duration and small magnitude, since the magnet 33 is relatively small, and which occur only during the generation of the line 27, since the magnets 33 pass under the pick-up unit 36 only while scanning slot 6 is passing by the aperture 13.

Pulses generated in the pick-up unit 36 are transferred via a lead 41 (Figure 1) to an amplitude discriminator 42, which discriminates against the low amplitude pulses 40, passing only the higher amplitude pulses 37, 38 and 39, these pulses being passed to a synchronizing system, which synchronizes the sweep of a saw-tooth sweep generator in conventional fashion (not illustrated), the synchronizing circuit and the sweep generator being incorporated in the unit 43, the output of which is applied via the lead 44 to the horizontal deflection electrodes of the cathode ray tube indicator 31.

Accordingly, a horizontal trace is initiated on the face of the cathode ray tube indicator 31 shortly after initiation of a scanning action by any one of the scanning slots 6, 7 and 8 of the scanning disc 9, and there is positive synchronization between the angular position of the scanning disc 9 and the sweep of the trace of the cathode ray tube indicator. By virtue of the fact that the position of the magnets 34, 35 and 32 is delayed slightly with respect to initiation of scanning action by the scanning slots 6, 7 and 8, the voltage pulses generated in the amplifier 25 in response to the sudden variations of light flux impinging on the photo-cell 3 during transition periods from one scanning slot to another is not indicated on the cathode ray tube indicator. At the same time the pulses generated on the lead 41 are applied via a further lead 45, which is connected with the lead 41, to the intensity control electrode of the cathode ray tube indicator 31. In response to each voltage pulse 40 present on the lead 41, the voltage of the intensity control electrode of the cathode ray tube indicator 31 is decreased sufficiently to cut off the beam of the indicator. Since a large number of such pulses are generated while the scanning slot 6 passes by the aperture 13, that is, while the diameter or size of the gauged element is being determined, or while the trace 27' is being generated, it will be seen that the trace 27' will consist of a large number of disconnected lines, and may thus be readily distinguished from the traces identified by the reference numerals 28′ and 29′, which are not interrupted.

One of the principal sources of errors in instruments of the type herein disclosed lies in the non-uniformity of the intensity of the light beam 5 over the area of the aperture 13. The object to be measured is located in a substantially parallel beam of light 5, and the shadow cast by the object on the slot 13 is then measured, in the present system. This measurement is, of course, indirect, and what is actually measured is the total quantity of light passing through the slot, rather than the quantity of light due to the shadow of the object being measured. Should the shadow move across the slot, the quantity of light passing through the slot will vary, if the light flux in successive vertical sections of the slot is not precisely uniform or equal, that is, an object of a given size will block different amounts of light if it occupies different vertical positions with respect to the slot 13.

The source of error described immediately above may be removed by masking the slot 13 along one edge thereof, as by means of a masking element 46 which has difference with different vertical levels along the slot 13. The width of the masking element 46 at each vertical height $h$ along the slot 13 may be determined by assuring that the total light flux passing through an element of the aperture 13 taken at any arbitrarily selected height $h_1$, and having an arbitrary width $dh_1$ is precisely equal to the light flux obtained at some other height $h_2$, assuming an identical width $dh_1$ of the latter element. Under these conditions, movement of the gauged element, be it a thread, a wire or a rod, vertically along the slot 13, will have no effect on the intensity, or total flux of light, issuing from the aperture 13 and impinging on the photo-cell 3.

Figure 2:
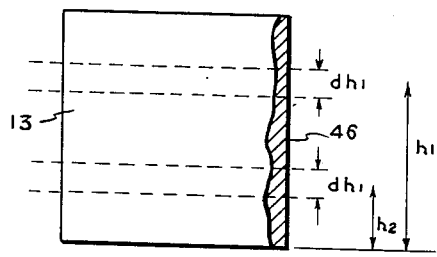
Figure 2 is a detail view, in front elevation, showing one of the slots incorporated in the structure of Figure 1 of the drawings, the slot comprising one form of corrective light valve, in accordance with the invention.
Figure 3:
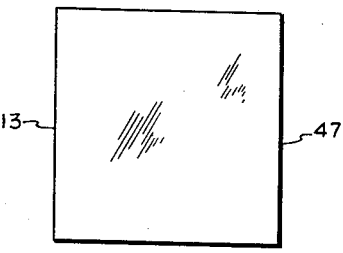
Figure 3 is a detail view, in front elevation, showing one of the slots incorporated in the structure of Figure 1 of the drawings, the slot comprising a modified form of corrective light valve, in accordance with the invention.

A modified form of corrective light valve is shown in Figure 3 of the drawings, wherein instead of providing a variable stopping element along one edge of the valve 13, as in Figure 2 of the drawings, the entire slot 13 is covered by a translucent film 47, the translucency of which has been so modified at each small area of the film 47 as to render uniform the light flux density issuing through the translucent film 47 for every such small area.

One convenient manner of fabricating a translucent film of the type disclosed involves the use of a photo-sensitive translucent element, which may be fabricated of glass or of celluloid, coated with a suitable light sensitive emulsion, as is the current practice in the photographic art, and which may be placed in an undeveloped state within the aperture 13. The light beam 5 may then be turned on for a very short period, and then turned off. The film may then be developed and will show darker or less translucent portions at those small areas thereof which were subjected to the areas of greater intensity of the light flux comprised in the beam 5, and areas of greater translucency for those small areas of the film 47 which were subjected to less intense portions of the beam 5. Accordingly, the film 47, when developed forms an excellent light equalizing filter for utilization in conjunction with the present invention.

It is not to be understood, however, that the present invention requires the use of filters of the type disclosed herein, and illustrated in Figures 2 and 3 of the drawings, in order to render same accurately, but rather, it is to be understood that the extremely great accuracy inherent in instruments constructed in accordance with the principles of the present invention may be still further enhanced by utilization of such light filters.

Referring now specifically to Figure 4 of the drawings, there is illustrated a schematic diagram of the optical system of the invention, including elements which have been before described and which are illustrated in Figure 1 of the drawings, the illustration provided in Figure 4 being, however, one involving the optical system only, apart from the elements of the system, and being provided in order to clarify certain aspects thereof.

Particular attention is directed to the location of the light source 2 with respect to the focal point 48 of the lens 4. It would normally be anticipated that the light source 2, for best operation, should be situated precisely at the focal point 48 in order that the beam 5 should consist of precisely parallel rays. I have found, however, in experimenting with machines constructed in accordance with the principles of the present invention that this is not the case, in fact, for reasons which are slightly obscure to me, but which appear to involve effects of diffusion and refraction at the boundaries of the object R being gauged. I have found that if the light source 2 is placed slightly closer to the lens 4 than the position occupied by the focal point 48, so that the rays of light constituting the beam 5 diverge very slightly, that movement of the object R parallel to the rays of light has substantially no effect upon the current flowing in the output circuit of the photo-cell 3, indicating that for light rays having this configuration, the total shadow cast by the object R is invariable with respect to position of the object R transversely of the light rays.

I further note in connection with Figure 4 of the drawings, the diffuser element 24 which has been described hereinbefore, and which is located intermediate the lens 23 and the photo-cell 3. It is the function of the lens 23 to cause that portion of the light beam 5 which has not been interrupted by the object R, or by the aperture 13, and which is identified by the reference numeral 22, to be focused on the cathode of the photo-cell 3, as an extremely small spot.

It has been found in practice, however, that the cathode of the photo-cell 3 does not have precisely uniform photo-emissivity and consequently that any variation of position of the object R for example, causes some slight variation in photo-cell output since the light beam 22 occupies slightly different positions as the object R being gauged varies its position.

It is further undesirable that the light provided by the beam 22 fall always on or adjacent to an identical extremely small portion of the cathode of the photo-cell 3 since thereby the life of the photo-cell is materially reduced, and since operation may become non-linear as the emissive spot on the cathode becomes saturated.

For all of the above reasons, the diffuser element 24 is introduced intermediate the lens 23 and the photo-cell 3. Introduction of the diffusing element 24, however, is not permitted to vary the spacing between the lens 23 and the cathode of the photo-cell 3, it being the sole function of the diffuser 24 slightly to broaden the spot of light imposed on the cathode of the photo-cell 3 by the lens 23, without changing its direction. It has been found by experiment that if the light from the lens 23 is focused on the diffuser 24 and the photo-cell 3 then caused to vary its output signal in response to the light arriving on the cathode thereof from the diffuser 24, that great inaccuracies are introduced in the system, but that if the beam of light deriving from the lens 23 be focused on the cathode of the photo-cell 3, as nearly as is possible practically, and the diffuser 24 thereafter introduced intermediate lens 23 and the cathode of the photo-cell 3, that the life of the photo-cell 3 is materially lengthened, and that the accuracy of the instrument and its freedom from predictable variations is materially increased.

Turning now to Figure 8 of the drawings, the output of the amplifier 25 may be developed across a load resistor 50 having one end grounded. The voltage developed across the output resistor 50 of the amplifier 25 is impressed between grid and cathode of a triode amplifier tube 51, having a load resistance 52 connected in the plate circuit thereof between the anode of the tube 51, and a source of positive potential labeled B+. Accordingly, the voltage appearing across the resistance 50 likewise appears across the resistance 52, but in amplified form, the voltage being of the form illustrated at 53, the line 54 representing an upper desired value, limit or tolerance, the line 55 a lower desired value, limit or tolerance, and the line 56 the voltage generated when the object being measured is scanned by the instrument.

In normal operation of the system, i. e., while the measured quantity falls between the established desired values, or tolerances, the voltage 56 falls between the voltages 54 and 55, and, accordingly, in explaining the operation of the system in the immediately following portion of the specification it will generally be assumed that such is the case. The voltage developed across the resistance 52 is applied via a lead 57 and a coupling condenser 58 to a slip ring 59, which is mounted on a shaft 60, driven from or forming part of the shaft 10 which drives the scanning disc 9, hereinbefore described. Accordingly, the voltage or wave form 53 is applied to the slip ring 59, and thence transferred to each of the commutator segments 61, 62, and 63, these latter being conductive each for less than 120° of the total circumference of the commutator segment, to avoid voltages occurring during transitions from one scanning slot to another, and these 120° segments being synchronized with the scanning action of the scanning wheel 9, or with the wave shape 53, so that from the commutator segment 61 may be derived one of the limit voltages, say the limit voltage 54, from the commutator segment 62 may be derived the remaining one of the limit voltages, say the voltage 55, and from the commutator segment 63 may be derived the voltage corresponding with the voltage level 56 of the wave form 53.

The voltages available on the commutator segments 61, 62 and 63 are applied over obvious circuits to charge the condensers 64, 65 and 66, respectively, these condensers being shunted respectively by resistances 67, 68 and 69, and each resistor-condenser combination having values so selected as to impart an extremely long time constant to the combination, so that the voltage across the condensers 64, 65 and 66 represent integrated voltages corresponding with average values of the portions 54, 55 and 56 of the wave form 53.

One terminal of each of the condensers 64, 65 and 66 are tied together and connected to the ungrounded terminal of a condenser 70, the remaining terminal of which is grounded. Since the condenser 70, then, is in series with each of condensers 64, 65 and 66, respectively, while the latter are being charged, the condenser 70 acquires a total charge which is proportional to the average of the charges applied to the separate condensers 64, 65 and 66, and the voltages in each of the latter differs from the developed across the condenser 70 by a value proportionate to the difference of each of the voltages 54, 55 and 56 of the wave form 53 from the average of the voltages 54, 55 and 56.

Voltage with respect to ground existing across the condenser 70 is transferred via a lead 71 to the control grid 72 of a double triode electronic amplifier tube 73, the anodes 74 and 75 of which are tied together and to the source of B+ utilized for energizing the electronic amplifier tube 51. The cathodes 76 and 77 of the double triode 73 are connected to opposite sides of a pair of series connected resistors 78, 79, the mid-point of which is grounded. In series with the resistor 78 is a further resistor 80, which is adjustable for the purpose of electrically centering the ground point. Accordingly, the current flowing in the resistance 78, and in the resistance 80, is directly proportional to the voltage existing across the condenser 70. Connected across the resistance 69 is a further resistance of extremely high value, identified by the reference numeral 81, which is variably tapped by means of a sliding contact 82 to form a potentiometer circuit. The sliding tap 82 is connected via a lead 83 to the control electrode 84 of the section of the double triode 73 comprising the anode 75 and the cathode 77. Current flowing in this side of the double triode 73 flows via resistance 79 to ground, and the current flowing in the resistance 79, and accordingly the potential appearing thereacross, is proportional to the voltage developed across the condenser 66 and accordingly to the test voltage 56, of the wave form 53, being reduced from that value, however, in accordance with the setting of the variable tap 82 on the resistance 81. Accordingly, the voltage existing between cathodes 76 and 77 of the double triode 73 is a measure of the difference of potentials existing on the condenser 70, and that portion of the potential existing on the condenser 66 which is tapped off by the variable tap 82. The setting of the variable tap 82 may be so made that for a standard value of a measured dimension of an object under test, which results in a voltage 56 precisely intermediate the values 54 and 55 of the wave form 53, the total voltage appearing between the cathode 76 and 77 shall be zero. Any deviation of the dimension of the object being tested from the normal or desired value then will result in an unbalanced voltage appearing between the cathodes 76 and 77, or a deviation from the zero value, such deviation representing the deviation of the measured quantity from its desired average value in both sense and magnitude. The voltage developed between the cathodes 76 and 77 of the double triode 73 is applied, via lead 85, to a sensitive voltage measuring instrument 86, which provides negative as well as positive readings of voltage, and which accordingly measures deviation in either direction of the value of the measured quantity from the average or desired value thereof. It will be noted that the circuit 85 proceeds via a pair of contacts 86, which, however, are normally closed and maintained closed by a normally energized relay 87. Upon deenergization of the relay 87, the contacts 86 open, and the circuit 85 is likewise open, which is a protective feature for the meter 86, the relay 87 being arranged to remain open so long as the measured quantity does not exceed certain predetermined limits capable of being measured by the meter 86 without damage thereto, in a manner hereinafter to be described.

The voltages on resistors 67 and 68, which represent the differences between the tolerances established in the system, that is, between the voltages 54 and 55 of the wave form 53, from the average value of the voltages 54, 55 and 56 as established by the voltage existing across the condenser 70, may be utilized for establishing an automatic volume control of the amplifier 25. To this end the center point of the resistance 67 may be grounded, and the center of the resistance 68 tapped, and the voltage existing at the tap conveyed via the lead 88 to the amplifier 25, the lead 88 being provided with the usual filtering condenser and resistance 89 and 90 to smooth out variations of the voltage impressed on the line 88, and to establish a smooth voltage for application to the amplifier 25, suitable for automatic control of gain.

Since the automatic volume control for the amplifier 25 is derived from the difference between lines 54 and 55 of the wave form 53, which are invariable in the system, once the dimensions of the apertures 14 and 15 have been established, the total amplification of the amplifier 25 is maintained substantially constant, since any increase in gain of the amplifier 25 effects a corresponding increase of the voltage across both condensers 64 and 65 in opposite directions so that the difference voltage increases, and this increase is applied to the amplifier 25 in such sense as to decrease the gain of the amplifier, and conversely, any decrease of gain of the amplifier accomplishes a decrease of voltage across the condenser 64 and 65 and a corresponding decrease of A. V. C. voltage applied to the amplifier 25, which tends to increase the gain. The system operates then to provide measurements which are substantially independent of amplification due to variation of voltages or tube constants within the amplifier 25.

The fact that a single voltage is developed, the magnitude of which is representative of the deviation of a measured quantity from a previously assigned value precisely intermediate two assigned tolerances or limit values, is taken advantage of in accordance with the present invention to provide indication and remote control circuits, the indication circuits indicating visually or aurally, as desired, whenever the value of the measured quantity exceeds an assigned limit, and the remote control circuit operating in response to increase or decrease of the measured quantity beyond an assigned limit to complete any desired operation, such as stoppage of a machine.

In order to provide indications of the increase or decrease of the measured quantity above or below the desired values or established limits, resort is had to a pair of thyratron circuits, involving thyratrons 91 and 92, which are normally maintained unfired so long as the value of the measured quantity remains intermediate the pre-assigned limits, the thyratron 91 firing, however, should the measured quantity exceed the upper limit, and the thyratron 92 firing should the measured quantity exceed the lower limit. The thyratrons 91 and 92 are energized from a source of alternating current potential 93, which feeds in parallel the primary windings 94 and 95 of a pair of transformers 96 and 97, the secondary windings 98 and 99 of which are connected between the cathode and the anode of the thyratrons 91 and 92 respectively in series with relay coils 100 and 101. The relay coils 100 and 101, accordingly, are normally de-energized while the value of the measured quantity resides between the pre-assigned limit.

It will be recalled that the voltage across the condenser 66 is a measure of the departure of the measured quantity from the mean value of the desired values or magnitudes assigned to the measured quantity, or, otherwise stated, the voltage across the condenser 66 is zero so long as the measured quantity remains at its pre-assigned or desired value. One terminal of the condenser 66 is connected to the condenser 70, the latter maintaining a charge equal to the average value of the voltages corresponding with the desired values of magnitudes. The remaining terminal of the condenser 66 is then connected via a lead 103 and a resistance 104 to the cathode of the thyratron 92 and to the control electrode of the thyratron 91, these latter electrodes being thus maintained at a potential equal to the deviation of the measured quantity from its pre-assigned value. The cathode of the thyratron 91 is connected via a resistance 105 and the lead 106 to the high potential terminal of condenser 64. Accordingly, the cathode of the thyratron 91 is normally maintained at a potential more positive than its control electrode, this condition obtaining until the potential across the condenser 66 exceeds that across the condenser 64, signaling that the value of the measured quantity exceeds its limit, or, referring to wave form 53, that the magnitude of the voltage 56 exceeds the magnitude of the voltage 54. Under this condition then, the cathode of the thyratron 91 becomes more negative than the control electrode thereof, and the thyratron 91 fires, energizing the relay 100.

The control electrode of the thyratron 92 is connected via a resistance 107 and a lead 108 to the low potential terminal of the condenser 65. Accordingly, and referring to the wave form 53, so long as the voltage 56 does not decrease to a value below the voltage 55, the control electrode of the thyratron 92 remains more negative than the cathode thereof and the thyratron 92 remains unfired. Should the value of the measured quantity, as indicated by the magnitude of the voltage 56, decrease below its pre-assigned limit as represented by the voltage 55, the control electrode of the thyratron 92 becomes more positive than its cathode, by reason of a reduction of the potential of the cathode, and the thyratron 92 fires, energizing the relay 101. A pair of signal lamps 109 and 110 is provided, which are energized from a source of alternating potential 111, and the lamp 109 via normally open contacts 112 which are responsive to energization of the relay 100 to close. Accordingly, upon energization of the relay 100, the contacts 112 close and the lamp 109 becomes energized, indicating that the value of the measured quantity has exceeded its upper limit.

The lamp 110, on the other hand, is energized from the source of potential 111 via normally open contacts 113, which are closed in response to energization of the relay 101. Accordingly, when the value of the measured quantity exceeds its lower limit and the thyratron 92 fires energizing the relay 101, the contacts 113 close, completing an energizing circuit for the indicator lamp 110, illumination of which indicates that the value of the measured quantity has decreased below its pre-assigned limit.

It will be obvious that the lamps 109 and 110 may be replaced by aural signaling means of any desired type, or by remote signaling means of any desired type, which may be lamps, or which may be some other type of visual indicator. A pair of normally closed contacts 114 is provided, which are opened in response to energization of the relay coil 100, and which serve normally to complete a circuit for the relay coil 87 via normally closed contacts 115, arranged to be open in response to energization of the relay coil 101. The source of energy for the relay 87 is the alternating current source 111, and the energizing circuit therefore is sufficiently obvious to require no description. The relay 87, accordingly, remains energized while the value of the measured quantity remains intermediate its assigned limits. While energized, the relay 87 pulls down on the armature 116, maintaining closed the contacts 86'; and thereby maintaining a circuit for the voltage measuring instrument 86, which, as has been explained hereinbefore, measures the voltage between the cathodes 76 and 77 of the double triode 73, and, accordingly, the value of the deviation of the measured quantity from its pre-assigned value. Energization of either relay 100 or 101, which indicates that the value of the measured quantity has exceeded one or another of its limits, serves to open either the contacts 114 or 115, as the case may be, breaking the energizing circuit for the relay coil 87 and, accordingly, releasing the armature 116 and opening the contacts 86' and thereby the circuit for the measuring instrument 86 is broken. The relay coil 87 and the contacts 86' associated therewith accordingly act as a protective circuit for the meter 86, opening the circuit of the meter 86 whenever the voltage impressed thereon exceeds pre-assigned limits which may be dangerous to the meter.

The armature 116 further serves as a reversing switch for modifying a circuit identified by the reference numeral 117, which may serve as a remote control circuit, for example, for shutting off a machine whenever the value of a product produced thereby exceeds pre-assigned limits measured in accordance with the system of the present invention. To this end, the armature 116 while the relay 87 is energized, maintains a pair of contacts 118 and in response to de-energization of the relay 87, opens the contacts 118 and permits the contacts 119 to close. The contacts 118 and 119 determine the condition of the circuit 117 which thereupon may remove or apply voltages as necessary to perform the remote function as desired in order to effect any type of control which the operator of the machine may have re-established.

It is also possible to replace meter 86 by a power amplifier, the output of which may be utilized to perform remote control functions, in accordance with principles well understood in the art.

While I have described and illustrated specific forms of the invention it will be clear that variations thereof may be resorted to without departing from the true scope of the invention as defined in the appended claims.

I claim:

1. A system for measuring the dimension of an object comprising, a test aperture adapted to be partially obstructed by said object, upper and lower limit apertures having areas corresponding to upper and lower limits, respectively, of a predetermined tolerance range of said dimension, a source of light, a photo-cell, means for passing said light through said test aperture and each of said limit apertures in succession onto said photo-cell, said last named means comprising a rotary scanning disc having a series of scanning slots each within a discrete angular segment of said scanning disc and having a radius aligned with one of said apertures, means coupled with said photo-cell for measuring only differences in the quantity of light passing through successive ones of said apertures to said photo-cell, and means responsive to said last named means for simultaneously indicating the boundaries of said tolerance range and the value of said dimension with respect to said tolerance range, said last named means comprising a cathode ray tube indicator having an indicating means deflectable in either of two coordinate directions, means responsive to said means for measuring for deflecting said indicating means in one of said coordinate directions, means for generating a repetitive sweep voltage, means responsive to said sweep voltage for deflecting said indicating means in the other of said coordinate directions, means for synchronizing said sweeping of said indicating means in said other of said coordinate directions in synchronism with transfer of said light from one of said apertures to another of said apertures, said means for synchronizing comprising a plurality of permanent magnets secured to said scanning disc and rotating therewith, each of said permanent magnets having a predetermined location with respect to one of said scanning slots, and a stationary pick-up coil located in inductive relation to said permanent magnets transiently during rotation of said scanning disc.

2. In a system for measuring a dimension of an object, a member having a test aperture and two comparison apertures, said test aperture having a larger area than said object and being partially obstructed thereby, the sizes of said comparison apertures corresponding respectively to upper and lower limits of said dimensions, a source of light, a photo-cell for providing output signals in response to light impinging thereon, a rotary scanning disc driven by said motor, said rotary scanning disc having scanning slots for illuminating said photo-cell through said apertures in sequence, a cathode ray tube indicator having a cathode ray beam deflectable in two coordinate directions, means for amplifying only variations in said output signals of said photo-cell to provide amplified variational signals, means for impressing said amplified variational signals to deflect said cathode ray beam in one of said two coordinate directions, means for sweeping said cathode ray beam in the other of said coordinate directions, said last named means comprising a repetitive sweep voltage generator, and means for synchronizing said sweeping of said cathode ray beam with sequential illumination of said photo-cell through said apertures in time relation adapted to effect transfer of light from one of said slots to another of said slots at the ends of said sweeps, said means for synchronizing comprising a plurality of permanent magnets secured to said scanning disc one adjacent each of said scanning slots, a stationary pick-up coil located adjacent the path of travel of said permanent magnet, whereby voltage is induced in said pick-up coil in response to passage of each of said permanent magnets immediately adjacent thereto, means for applying said voltages to said sweep voltage generator for synchronizing said sweep voltage generator, a further plurality of permanent magnets secured to said scanning disc for passage adjacent said pick-up coil during illumination of said test aperture from said source of light whereby further voltage impulses are induced in said pick-up coil during passage adjacent thereto of said further permanent magnet, and means for applying said last named voltage impulses to modulate said cathode ray beam.

3. An electronic system for determining whether a given quantity lies within a predetermined tolerance range comprising, means for generating a first voltage having a magnitude proportional to the value of the upper limit of said tolerance range, means for generating a second voltage having a magnitude proportional to the value of the lower limit of said tolerance range, means for generating a third voltage having a magnitude equal to the value of said quantity, an alternating current amplifier having means for preventing transfer of direct current components of signals applied thereto, and means for applying said voltages periodically in alternation to said amplifier for amplification thereby, said amplifier providing output signals having magnitudes representative of the deviations of each of said first, second and third voltages from a voltage representing the arithmetic mean of said first, second and third voltages, means for visually indicating the magnitudes of said deviations, and means for modulating that one of said visual indications representative of the deviation of said third voltage from said voltage representative of the arithmetic mean of said voltages to distinguish said last named indication from the remaining indications.

4. In a system for measuring a dimension of an object, a member having a comparison slot and a test slot partially obstructed by said object, means for providing a beam of light, a photo-cell, means for directing said beam of light on said photo-cell through said test slot and through said comparison slot alternately and in rapid succession, said last named means comprising a mechanical shutter, a cathode ray tube indicator having an indicating electron beam and means for deflecting said electron beam in two coordinate directions, means for deriving output signal from said photo-cell, means for amplifying the varying component only of said output signal to derive difference signals, means for applying said difference signals to said means for deflecting to deflect said beam in one of said coordinate directions, means for generating a sweep voltage, means for applying said sweep voltage to said means for deflecting to deflect said beam in the other of said coordinate directions, means for generating synchronizing signals in response to motion of said mechanical shutter, and means responsive to each of said synchronizing signals for initiating one of said sweep voltages.

5. A system in accordance with claim 4 wherein said means for generating synchronizing signals comprises at least one permanent magnet secured to said mechanical shutter and a stationary pick-up coil located in inductive relation to said permanent magnet periodically in response to motion of said shutter.

RAYMOND M. WILMOTTE.

References Cited in the file of this patent
UNITED STATES PATENTS

| Number | Name | Date |
|---|---|---|
| 2,004,798 | Poser | June 11, 1935 |
| 2,260,702 | Collins | Oct. 28, 1941 |
| 2,330,877 | Fleisher et al. | Oct. 5, 1943 |
| 2,396,998 | Garstang et al. | Mar. 19, 1946 |
| 2,398,904 | Libman et al. | Apr. 23, 1946 |
| 2,411,741 | Michaelson | Nov. 26, 1946 |
| 2,413,080 | Seeley | Dec. 24, 1946 |
| 2,422,766 | Alexander | June 24, 1947 |
| 2,456,499 | Fritzinger | Dec. 14, 1948 |
| 2,488,269 | Clapp | Nov. 15, 1949 |
| 2,488,430 | Offner | Nov. 15, 1949 |
| 2,494,441 | Hillier | Jan. 10, 1950 |
| 2,505,316 | Wilmotte et al. | Apr. 25, 1950 |